Nov. 16, 1965   H. T. PRESTIGE   3,217,398
METHODS OF INSERTING INSERTS THROUGH SOLID BODIES
Filed Nov. 2, 1962   5 Sheets-Sheet 1

INVENTOR
H. T. Prestige
By Holcomb, Wetherill & Brisebois
ATTORNEYS

Nov. 16, 1965  H. T. PRESTIGE  3,217,398
METHODS OF INSERTING INSERTS THROUGH SOLID BODIES
Filed Nov. 2, 1962                                   5 Sheets-Sheet 2

INVENTOR
H. T. Prestige
By Holcombe, Wetherill & Brisbin
ATTORNEYS

Nov. 16, 1965       H. T. PRESTIGE       3,217,398
METHODS OF INSERTING INSERTS THROUGH SOLID BODIES
Filed Nov. 2, 1962                       5 Sheets-Sheet 3
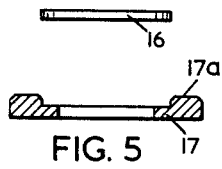
FIG. 5
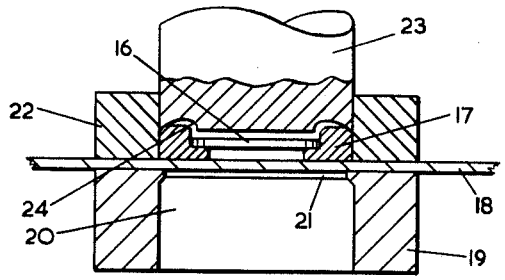
FIG. 6
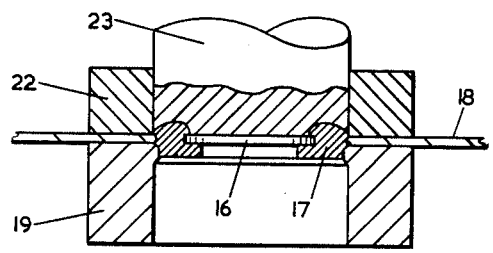
FIG. 7
FIG. 8
INVENTOR
H.T. Prestige
By Holcombe, Wetherill & Brisbois
ATTORNEYS Nov. 16, 1965   H. T. PRESTIGE   3,217,398
METHODS OF INSERTING INSERTS THROUGH SOLID BODIES
Filed Nov. 2, 1962   5 Sheets-Sheet 4

INVENTOR
H. T. Prestige
By Holcomb, Wetherill Brunton
ATTORNEYS

Nov. 16, 1965  H. T. PRESTIGE  3,217,398
METHODS OF INSERTING INSERTS THROUGH SOLID BODIES
Filed Nov. 2, 1962  5 Sheets-Sheet 5

INVENTOR
H. T. Prestige
By Holcombe Wetherille Brinton
ATTORNEYS

United States Patent Office 3,217,398
Patented Nov. 16, 1965

3,217,398
METHODS OF INSERTING INSERTS
THROUGH SOLID BODIES
Harry Thomas Prestige, Dartford, England, assignor to
J & S Engineers Limited
Filed Nov. 2, 1962, Ser. No. 234,922
Claims priority, application Great Britain, Nov. 3, 1961,
39,412/61
14 Claims. (Cl. 29—432)

This invention relates to methods of inserting inserts through solid bodies.

The specification of my copending application Serial No. 180,742 describes a method of inserting into an imperforate sheet a terminal post assembly comprising a metal conductor lying coaxially within an insulated plastic bush.

The assembly is inserted in the sheet by a method in which the plastic bush is compressed against the surface of the sheet so that it exerts hydrostatic pressure and punches out a piece of material from the sheet. The bush is then forced into the place of the punched out piece of material so that the terminal post assembly is left inserted in the sheet.

To achieve this insertion the composite insert is located between a ram and a die, the plate is located between the insert and the die and an insert shrouding member is located between the plate and the ram. When pressure is applied between the shrouding member and the die, a seal is formed between the shrouding member and the sheet, so that further pressure applied between the ram and the die compresses the insert such that it acts as a liquid to shear out a piece of the sheet corresponding to the die bore.

The end face of the ram has a face complementary to the adjacent face of the insert so that when pressure is applied to insert the insert said adjacent surface substantially retains its original shape.

An object of the present invention is to cold form the insert to any required shape. A further object is to enable the component parts of a composite insert, such for example as the insert aforementioned, to be assembled together and the resultant assembly to be inserted in a sheet during the same operation.

Accordingly in one aspect the invention provides a method of providing a composite insert in a previously imperforate sheet of material, one of the insert components being of a material softer than the sheet material, comprising the steps of placing the imperforate sheet between the ram and the die of a press, retaining the separate insert components between the ram and the sheet so that said components are successively aligned with the die and each other in the direction of movement of the ram, moving the ram and die together to force said components together to constitute the composite insert, shrouding the space between the ram and the sheet to enclose at least said one component of the insert and to restrict cold flow of the material thereof, and continuing said movement of the ram and die to force said insert into the sheet while a part of the sheet is sheared out into the die.

In another aspect the invention provides a method of inserting an insert into a previously imperforate sheet of material, the insert being of material softer than the sheet material, which comprises the steps of placing the imperforate sheet between the ram and die of a press, placing the insert between the ram and the sheet, shrouding the space between the ram and the sheet to enclose the insert, moving the ram and die together to compress the insert to fill all the space between the ram, the shroud and the sheet and to force the insert into the sheet while a part of the sheet is sheared out into the die, the insert being cold formed during the process so that it retains a shape different from its original shape.

Embodiments of the invention will now be described, by way of example only, with reference to the accompanying drawings of which:

FIGURE 5 is a side view of the component parts of an alternative form of insert;

FIGURE 6 is a side view of part of the apparatus for inserting the components of FIGURE 5 in a plate;

FIGURE 7 is a view similar to FIGURE 6 but showing the apparatus after the insertion operation;

FIGURE 8 is a side view of the plate complete with insert;

Referring to FIGURES 1 to 4, FIGURE 1 shows the assembled insert inserted in a metal sheet 1, the insert comprising an elongated metal conductor pin 2 (intended to serve as a terminal post) extending through the sheet and insulated therefrom by a surrounding plastic bush 3. The pin is keyed to the bush and the bush is keyed to the sheet, thereby preventing relative axial movement of the parts.

Figure 1:
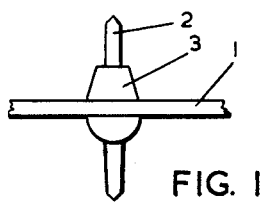
FIGURES 1 and 4 are side views of different assembled inserts inserted in a plate.

A final assembly as shown in FIGURE 1 is produced by starting with the pin 2, a billet of plastic material which will be formed into the bush 3, and an imperforate sheet 1; said final assembly being formed in a single press operation.

Figure 2:
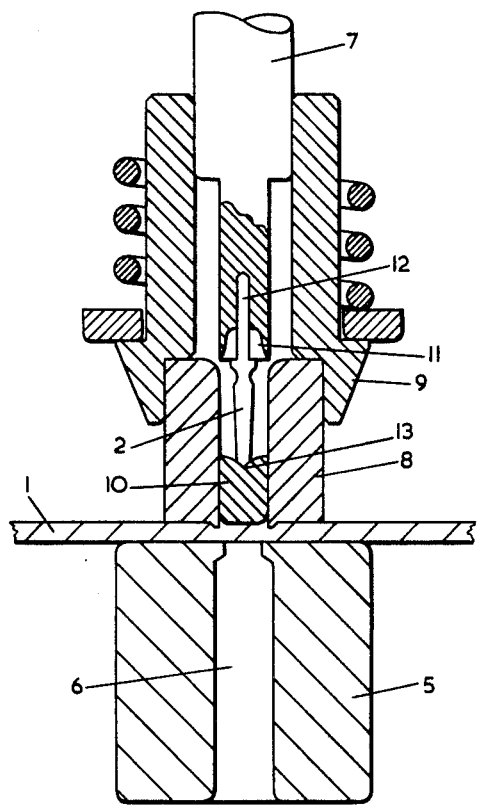
FIGURE 2 is a sectional view of part of a press apparatus according to the invention, with the apparatus loaded prior to operation.

Referring to FIGURE 2, one embodiment of press apparatus suitable for performing said single press operation comprises a die 5 having a die bore 6. Above the die is a punch assembly comprising a ram 7, a shroud 8 and a shroud carrier 9. The general arrangement of these parts and ancillary devices and features (not shown), are substantially as described in our aforesaid copending application, with particular reference to the embodiment shown in FIGURES 1 to 5, thereof.

The lower reduced portion of the ram 7 has a recess 11 in its end face and this has a shape complementary to that of the upper part of bush 3 (FIGURE 1). Also, a bore 12 extends upwardly in this recess to accommodate the upper projecting part of the pin 2.

Figure 3:
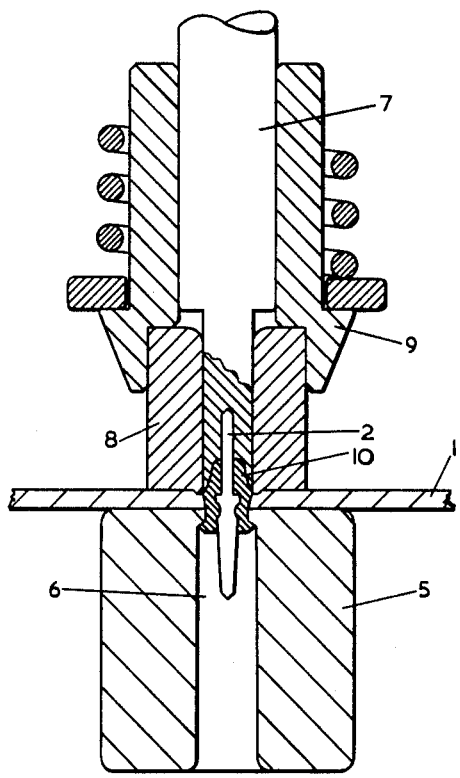
FIGURE 3 is similar to FIGURE 2 with the apparatus shown at the end of the operating stroke.

In operation, said pin is inserted in the ram bore 12, as shown, and a cylindrical billet 10 of plastic material is inserted in the lower end of the shroud bore. The shroud is then attached to the carrier 9 so that the lower end of the pin seats in a central recess 13 preformed in the top surface of the billet. The length of the billet is chosen so that, after insertion, the resultant bush has the desired dimensions. The press apparatus is then operated and, initially, the lower end of the pin is forced downwardly and co-axially through the billet and pierces the sheet 1. At this stage, the upper part of the billet fills the ram recess 11 and thereafter the billet exerts hydrostatic pressure on the sheet to press out therefrom a piece of material which drops into the die bore. The hydrostatic pressure is thereby released and the billet, again behaving as a solid, is forced through the aperture in the sheet and into the die bore. This condition is shown in FIGURE 3.

The ram is lifted away from the sheet, and the die is opened or expanded, leaving the final assembly as shown in FIGURE 1. The upper part of the bush is shaped due to cold flow while the material is exerting hydrostatic pressure on the sheet 1 and the lower part takes up a shape as indicated due to the inherent resilience of the material which relaxes when the die is opened. The bush is of reduced diameter where it lies within the sheet aperture and is thereby keyed to the sheet. The pin 2 is provided with ridges and grooves, as shown, mid-way along its length which key the pin to the bush.

Figure 4:
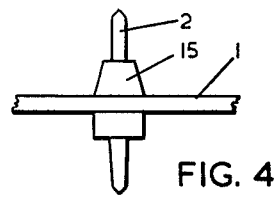
Figure 9:
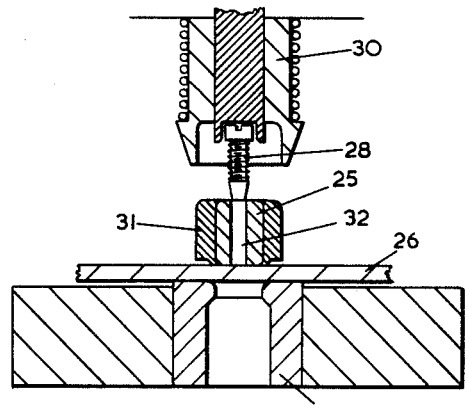
FIGURE 9 is a side view of apparatus for inserting a further form of insert, prior to the insertion operation.
Figure 10:
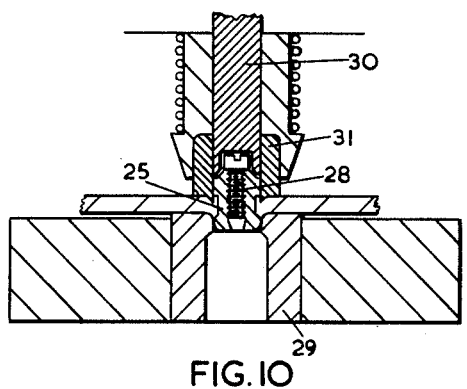
FIGURE 10 is a view similar to FIGURE 9 after the insertion operation.

Furthermore, if a die is employed having a rectangular (e.g. square) aperture, then the piece of material pressed out from the sheet will be rectangular and the billet material will be extruded through the hole which is left so as to have a rectangular cross-section within and below the sheet. An insert assembled in this way is shown in FIGURE 4, in which the insulating bush 15 has an upper portion formed with a circular cross-section (as in FIGURE 1) and a lower portion formed with a square cross-section. The particular advantage of a rectangular bush shape, within the sheet, is that it prevents rotation of the bush relative to the sheet.

Referring to FIGURES 5 to 8, an alternative insert consists of a rigid insert plate 16 and an annular plastic (e.g. nylon) gasket or sealing ring 17 having an upwardly projecting rim 17a. The inner periphery of the rim 17a is the same size and shape as the periphery of the insert plate 16, the plate being a press fit within the rim.

The apparatus for inserting this composite insert in an imperforate sheet 18, e.g. of metal or a non-metal such as S.R.B.P. board, comprises a die 19 having a bore 20 with restricted aperture 21. Above the die is a shroud 22 and a ram 23, the ram being in alignment with the die aperture 21 and a close sliding fit in the bore of shroud 22. Although any shape may be employed, it will be assumed that the insert plate 16 and the ring 17 are circular, so that the shroud bore and the die aperture are also circular, the ring 17 being a close fit in the shroud bore and the die aperture having a slightly smaller diameter than the shroud bore. The end face of the ram has a peripheral recess 24 into which the rim 17a of the ring 17 projects when the various parts are as shown in FIGURE 6, prior to the insertion operation. As in the previous embodiment the recess 24 has a different section from that of the rim 17a, the recess section depending upon the cold-formed shape of the plastic ring required after insertion.

As before pressure is applied between ram and die to cause the plastic material of ring 17 to behave as a liquid surrounding the insert plate 16. A combination of hydrostatic pressure and direct pressure through plate 16 shears a piece of material from the sheet 18 through the die aperture into the bore 20, the sheared piece of material having the same size and shape as the die aperture, and the insert follows through until the parts arrive at the positions shown in FIGURE 7. As will be seen, the ring 17 now lies partway through the sheet 18 and the insert plate 16 lies in the plane of the panel. Also, the rim 17a has undergone a change of shape due to cold-forming during insertion and is now complementary to the ram recess 24.

When the sheet, with insert, is removed from the die the plastic material recovers slightly, particularly in the region which projected into the die aperture. Thus, slight elastic expansion occurs in this region to key the ring to the sheet 18, as seen in FIGURE 8.

In the third embodiment of the invention, FIGURES 9 to 14, a plastic (e.g. nylon) slug 25 is inserted in an imperforate sheet 26, e.g. of metal or a non-metal such as S.R.B.P. board, the slug being cold-formed into a threaded bush 27 during the insertion operation. This embodiment is in many respects similar to the first embodiment shown in FIGURES 1 to 4, except that the metal post is replaced by a removable threaded member, as shown a taper-ended screw 28.

The insertion apparatus comprises a die 29, a punch 30 and a rigid shroud 31, the end of the ram being adapted to receive and temporarily retain the head of the screw 28, as shown. The slug 25 has a preformed bore 32 of a diameter not more than that of the screw as measured across the thread valleys. During the insertion operation, pressure is applied between ram and die so that the screw is forced through the plastic slug bore. Then the plastic material, acting as a liquid, shears a piece from the sheet and follows through to the position shown in FIGURE 10. At the same time, the slug bore cold-forms to the shape of the screw thread and the outer surface of the slug cold-forms to the shape of the ram end face.

After the sheet, with insert and screw, have been removed from the die and the screw removed, the bush insert 27 is as shown in FIGURE 7. Assuming the bore of shroud 31, and therefore the slug 25, to be circular then the part of the bush projecting above the sheet will appear as shown in the plan view of FIGURE 12. Assuming the die aperture to be square, then the part of the bush projecting below the sheet will appear as shown in the bottom plan view of FIGURE 13. The die aperture may be any other desired shape, e.g. hexagonal.

Figure 11:
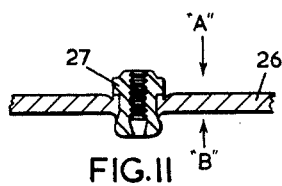
FIGURES 11 to 13 are side, top and plan views respectively of the insert of 9 inserted in a plate.
Figure 13:
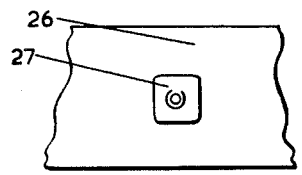
Figure 12:
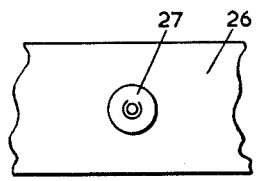
Figure 14:
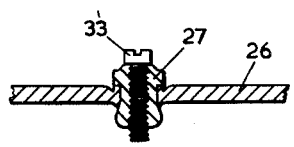
FIGURE 14 is a view similar to FIGURE 11.

As seen in FIGURE 11, the threaded bore of the bush tapers at its bottom end in conformity with the tapered end of screw 28. Thus, when the non-tapered screw 33 (FIGURE 14) is secured in the bush, its end will be gripped by the bush whilst the bush material will be forced outwardly to effect increased keying between the bush and the sheet.

Figure 15:
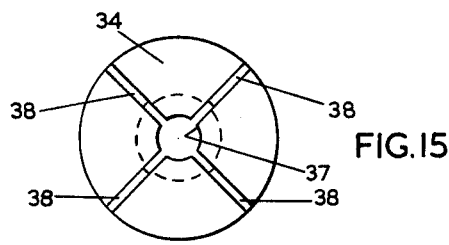
FIGURE 15 is a side view of an alternative form of bush for the insert of FIGURE 11.
Figure 16:
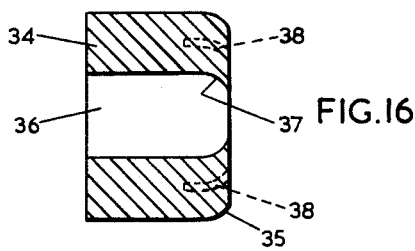
FIGURE 16 is a plan view of the bush of FIGURE 15.

A further form of bush is shown in FIGURES 15 and 16 in which the bush 34 is of circular cross section having its leading end 35 tapering inwardly. A central circular section bore 36 also tapers inwardly at 37 at the leading end of the bush. The leading end is cross cut at 38. By means of this cross cut a more controlled locking is achieved when a screw or the like is inserted in the bore as described in the above-mentioned copending application.

The bush may have a section other than circular.

From the foregoing description it will be appreciated that the main feature of cold-forming an insert during insertion in an imperforate sheet may be applied to an insert wholly of plastic material. Thus, a slug of plastic material (e.g. nylon) may be cold-formed during insertion so that the part of the insert projecting above the sheet has a shape complementary to whatever shape is chosen for the end face of the insertion ram.

Furthermore, instead of a plastic material such as nylon, the insert may be formed from a slug of soft metal, e.g. aluminum or soft brass.

I claim:

1. A method of providing a composite insert in a previously imperforate sheet of material, one of the insert components being of a material softer than the sheet material, comprising the steps of placing the imperforate sheet between the ram and the die of a press, retaining the separate insert components between the ram and the sheet so that said components are successively aligned with the die and each other in the direction of movement of the ram, moving the ram and die together to force said components together to constitute the composite insert, shrouding the space between the ram and the sheet to enclose at least said one component of the insert and to restrict cold flow of the material thereof, and continuing said movement of the ram and die to force said insert into the sheet while shearing a part of the sheet out into the die, and causing those surfaces of said softer component which face the other component to conform closely to the contour thereof.

2. A method according to claim 1 in which the insert material which is softer than the sheet material is cold formed during the operation.

3. A method according to claim 1 in which the part of the insert material softer than the sheet material which is in contact with the lower face of the ram during insertion is cold formed to retain substantially the shape of that face after insertion.

4. A method according to claim 1 in which said one component of the insert is a solid slug of material and a further component of the insert is a metal terminal post, which is pushed through said one component to constitute the composite insert.

5. A method according to claim 1 in which said one component of the insert consists of a gasket having an upwardly projecting rim, and a further component of the insert is a rigid plate having a periphery of the same size and shape as the inner periphery of the gasket, and in which the rim is cold formed to key the plate in the gasket.

6. A method according to claim 1 in which a further component of the insert is a threaded screw which is forced through said one component to form the composite insert, said one component being cold formed during the operation so that it retains a threaded bore when the screw is removed.

7. A method according to claim 1 in which the softer insert component takes the shape of the die during insertion and expands when pressure is removed thereby keying the insert to the sheet.

8. The method of positioning a composite insert in a sheet of material, said insert comprising at least two components, one of which is softer than said sheet and the other of which is harder than said softer component, said harder component having at least one portion which is smaller in diameter and shorter than said softer component and which is defined between two inwardly directed edge portions, said method comprising the steps of placing the sheet between a die and ram, placing the insert components between said ram and sheet in alignment with said ram and die, shrouding the space between said ram and sheet to closely enclose said softer component and prevent radially outward flow by the material thereof, and moving said ram and die together so as to force said harder component through said softer component and force both components through said sheet, while shearing a slug from said sheet, and permanently deforming said softer component, so as to cause the surfaces of said softer component which face said harder component to conform closely to the contour of at least said shorter portion thereof, including said inwardly directed edges.

9. The method claimed in claim 8 which comprises the step of using as the harder component a screw, each of the threads of which constitutes one of said shorter portions, and using as the softer component a ring provided with an internal bore having a diameter no greater than the root diameter of said screw.

10. The method claimed in claim 9 which comprises the step of using as the harder component a tapered screw, unscrewing said tapered screw, and replacing it with a screw having a uniform root diameter equal to the largest root diameter of said tapered screw.

11. The method claimed in claim 8 comprising the step of using as said softer component a ring having an inwardly directed flange and as said harder component a disc dimensioned to lie on said flange with the peripheral portions of the upper and lower surfaces of said disc serving as said inwardly directed edges.

12. The method claimed in claim 8 comprising the step of using a die having an aperture which is other than circular in section.

13. The method claimed in claim 8 comprising the step of using a die having an opening smaller in at least one dimension than the leading end of said softer component.

14. The method of positioning a composite insert in a sheet of material, said insert comprising an outer component which is softer than said sheet and an elongated inner component which is harder and smaller in transverse section than said outer component and provided with at least one transversely projecting key, said method comprising the steps of placing the sheet between a die and a ram, placing the insert components between said ram and said sheet in alignment with said ram and die, shrouding the space between said ram and sheet to closely encircle said softer component and prevent radially outward flow by the material thereof, and causing said ram and die to approach each other so as to force said harder component through said softer component and force both components through said sheet, while shearing a slug from said sheet and permanently deforming said softer component so as to cause the surfaces of said softer component which face said harder component to conform closely to the contour of said harder component and grip said key.

References Cited by the Examiner
UNITED STATES PATENTS

| | | | |
|---|---|---|---|
| 2,275,438 | 3/1942 | Hothersall | 29—432 |
| 2,432,949 | 12/1947 | Thorngren. | |
| 2,593,506 | 4/1952 | Wales | 29—432 |

WHITMORE A. WILTZ, *Primary Examiner.*

JOHN F. CAMPBELL, *Examiner.*